United States Patent [19]

Conwell

[11] Patent Number: 4,858,147
[45] Date of Patent: Aug. 15, 1989

[54] SPECIAL PURPOSE NEUROCOMPUTER SYSTEM FOR SOLVING OPTIMIZATION PROBLEMS

[75] Inventor: Peter R. Conwell, Salt Lake City, Utah

[73] Assignee: Unisys Corporation, Blue Bell, Pa.

[21] Appl. No.: 61,744

[22] Filed: Jun. 15, 1987

[51] Int. Cl.$^4$ ............................................. G06F 9/00
[52] U.S. Cl. ................................... 364/513; 364/200; 364/148
[58] Field of Search ........ 364/148, 513, 200 MS File, 364/900 MS File

[56] References Cited

U.S. PATENT DOCUMENTS

| | | | |
|---|---|---|---|
| 3,273,125 | 9/1966 | Jakowatz | 364/900 |
| 3,484,749 | 12/1969 | Andreae | 364/900 |
| 3,579,191 | 5/1971 | Andreae | 364/900 |
| 3,701,974 | 10/1972 | Russell | 364/900 |
| 3,950,733 | 4/1976 | Cooper | 364/513 |
| 4,193,115 | 3/1980 | Albus | 364/513 X |
| 4,660,166 | 4/1987 | Hopfield | 364/513 X |
| 4,731,747 | 3/1988 | Denker | 364/513 X |

OTHER PUBLICATIONS

Boltzmann Machines: Constraint Satisfaction Networks that Learn, Hinton et al, Tech. Report CMU-CS-8-4-119, May 1984.

Computing with Neural Networks, Hopfield et al., Science, vol. 233, 8/86, 625–633.

A Possible Organization of Animal Memory and Learning, Cooper, Nobel (24) (1973), pp. 252–264.

Neural Networks and Physical Systems with Emergent Collective Computational Abilities, Hopfield, Proc. Natl. Acad. Sci., USA, vol. 79, pp. 2554–2558, 4/82.

An Introduction to Computing with Neural Nets, Lippmann, IEEE ASSP Magazine, 4/87, pp. 4–21.

Primary Examiner—John R. Lastova
Attorney, Agent, or Firm—Alfred W. Kozak; Nathan Cass

[57] ABSTRACT

A network of N parallel processors are each one cross-connected to each other. Each cross connection includes a nodal weight delay circuit which carries status information as to whether a processor is "on" (=1) or "off" (=0) and whether its weighted influence ($w_{ij}$) is excitatory or inhibitory as between the two processors i and j on that cross connection. Additionally, the cross connection influence between a processor i and a processor j is time delayed with a selectively fixed set of machine cycles between any two processor i and j. A monitoring processor-controller senses when the majority of processors have achieved a stable non-changing state which will represent an optimum solution for a combinatorial problem.

13 Claims, 7 Drawing Sheets

|  | PROCESSORS "j" | | | | | | | |
|---|---|---|---|---|---|---|---|---|
|  | $NP_1$ | $NP_2$ | $NP_3$ | $NP_4$ | $NP_5$ | $NP_6$ | $NP_7$ | $NP_8$ |
| $NP_1$ | 0 | | | | | | | |
| $NP_2$ | | 0 | | | | | | |
| $NP_3$ | | | 0 | | | $w_{ij}$ | | |
| $NP_4$ | | | | 0 | | | | |
| $NP_5$ | | | | | 0 | | | |
| $NP_6$ | | | | | | 0 | | |
| $NP_7$ | | $w_{ij}$ | | | | | 0 | |
| $NP_8$ | | | | | $w_{ij}$ | | | 0 |

PROCESSOR "i"

16 DATA BITS

SPECIAL PURPOSE NEUROCOMPUTER SYSTEM FOR SOLVING OPTIMIZATION PROBLEMS

FIELD OF THE INVENTION

This disclosure relates to neurocomputer systems which simulate the nervous systems in living structures, and which provide capabilities of solving complex combinatorial problems in a relatively rapid and economic fashion.

BACKGROUND OF THE INVENTION

Considerable studies and research for a number of years has continued in the functions of living neurons which are grouped in complex interconnected networks and which can be seen to act as types of problem-solving computer systems.

By posing electronic networks which simulate the interconnected neuronic networks, it has been felt that many problems could be efficiently solved through the computational capabilities required for solving a class of problems which involve "combinatorial complexity".

This class of problems are often found in engineering and commercial ventures from simulation of the problems of perception and recognition which must be handled by the nervous systems of living creatures.

For example, if one is given a map and has the problem of driving from a given source city over to a destination city, which could be considered as the best route to travel? Another common example is the problem of designing circuit boards in regards to where is the best location to put each of the multiple numbers of chips in order that an efficient wiring layout can accompany the components.

These types of analogies and optimizational problems have been described in the publication *Biological Cybernetics* by J. J. Hopfield and D. W. Tank, published 1985 in Volume 52 at pages 141-152. This article is entitled "Neural Computation of Decisions in Optimization Problems".

Studies of neural architecture indicate that a broad category of parallel organization is in operation rather than a series of step-by-step processing functions as occurs in general purpose computers. If each of the neurons is considered as a simple processing unit, it is seen that these biological systems operate in a "collective" or a "group operative" mode with each individual neuron connected to and summing the inputs of hundreds of other individual neurons in order to determine its own output signal.

The computational load of taking these many sensory inputs and reducing them to a "good" or even an "optimum" solution seems to be one feature of these biological and neuronic system networks. Apparently, a collective solution is computed on the basis of the simultaneous reactions, on each other, of hundreds of neurons (or processing units which simulate them).

Thus, if a multiple number of interconnected neurons (or processors) are fed input signals, each of the individual neurons will provide an output signal at some time according to its own individual input signal and to those parallel interconnected impulses it receives from its neighboring neurons (processors). The overall result of the output signals of the collective group of neurons is a "global output signal" which represents the collective judgement of the neural network.

Modern digital general purpose computers using the standard Very Large Scale Integrated circuitry will generally involve logic gates where each logic gate will obtain inputs from two or three other gates in order to come to certain binary decisions in the course of a computation. However, in the situation of non-linear neural processors (neurons), organized in a collected parallel-processing network, these get inputs from practically all of the other neural processors and then compute a "collective" solution on the basis of simultaneous interactions of the hundreds of units or devices involved.

The neural computational network will be seen to have three major forms of parallel organizations: (i) parallel input channels, (ii) parallel output channels, and (iii) a large amount of interconnectivity between the processing elements (neurons).

The processing components are considered to have "time constants" which provide for the integrated summation of the synaptic input currents from other neurons in the network. In simulation of the biological neuronic network, it is possible to determine the interconnection paths so that they will be of an (i) excitatory or influential nature and (ii) an inhibitory or negative, suppressive nature.

J. J. Hopfield of the California Institute of Technology has shown that the equations of motion for a network (with symmetric connections) will always lead to a "convergence" of "stable states" in which the outputs of all neurons remain constant.

Thus, networks of neurons with this basic organization can be used to compute solutions to specific optimization problems by first choosing connectivities and input bias currents which appropriately represent the function to be minimized.

After the programming of the network is organized, an initial set of input voltages are provided and the system then converges to a "stable state" which minimizes the function. The final "stable state" is interpreted as a solution to the problem. Thus the set of outputs then provides an answer which is considered to represent a solution to the problem.

An example of such a combinatorially complex problem is often cited as the TSP or Travelling Salesman Problem where, for example, it is given that a salesman is to travel to N different cities and then to find out the optimal tour or travel sequence necessary to minimize time and costs.

This type of problem which might normally involve "N-factorial" numbers of computations using ordinary computer networks, is found to come to relative rapid and efficient optimization solutions using the neural parallel-cost-related biological type architecture.

A network organized neuronically for the solution of the Travelling Salesman Problem may be referred to as the "TSP network." Then, to enable the N neurons in the TSP network to compute a solution to the optimization problem, the network is described by an energy function (E) in which the lowest energy state (considered the most stable state of the network) is taken to correspond to the best path or tour.

The concept of "convergence" is used to indicate that the network has settled on a final set of condition-states in each of the neurons (processors) and these states are no longer changing.

Thus, system networks of microelectronic neurons (simulating biological neuronic systems) would appear to rapidly solve difficult optimization problems by the system of "convergence" whereby the states of the neuronic processors involved, have settled down to a "non-changing" minimal energy (E) state.

These systems appear to be uniquely adaptable to the handling of combinatorial optimization problems which involve finding the minimum value of a given function which normally depends on many parameters.

An article in the publication *Science* on May 13, 1983, in Volume 220, pages 671 through 679, and entitled "Optimization by Simulation Annealing" has compared the analogy of annealing solids as providing a framework for optimization of the properties of large and complex systems.

The subject of combinatorial optimization involves a set of problems which are central to disciplines of computer science. Research in this area aims at developing efficient techniques for finding minimum or maximum values of a function having many independent variables. The TSP problem belongs to this area of research and is often used and tested for results using experimental procedures.

As indicated by the authors Kirkpatrick, Gelatt, Jr., and Vecchi in the *Science* article, there are two basic strategies in the heuristic methods of problem solving. The first may be called (i) "divide-and-conquer" and the second (ii) may be called "iterative improvement".

In the first strategy, (i), one divides the problems into subproblems of manageable size, then solves the subproblems, then the solutions to each of the subproblems must be patched together in order to produce an overall solution.

In the second strategy, (ii), of iterative improvement, one starts with the system in a known configuration and then a standard "rearrangement operation" is applied to all parts of the system, in turn, until a rearranged configuration that improves the cost or energy function (E) is discovered. The "rearranged configuration" becomes the new configuration of the system and the process is continued until no further improvements can be found.

It may be noted in the strategy (ii) that this search may sometime get stuck in a "local minima" which is not yet a "global optimum", and thus it is customary to carry out this process several times while initially starting from different, randomly selected configurations, and then to go ahead and save the best result.

Condensed matter physics is a body of methods for analyzing aggregate properties of the large number of atoms to be found in samples of liquid or solid matter. This physics uses statistical mechanics as a central discipline.

Because of the tremendous numbers involved, such as, for example, wherein the number of atoms involved is on the order of $10^{23}$ per cubic centimeter, then only the "most probable" behavior of the system in thermal equilibrium, at a given temperature, is observed in experiments.

A fundamental question concerns what happens to this type of system in the limit of low temperature—for example, whether the atoms will remain fluid or will solidify, and if they solidify, will they form a crystalline solid or a glass.

Experiments that determine the low-temperature state of a material, for example, by growing a single crystal from a melt—are done by slow, careful annealing. This is done by first melting the substance, then lowering the temperature slowly, and spending a long time at temperatures in the vicinity of the freezing point.

This is comparable to the previously mentioned condition of lowering the energy level (E) in order to find the optimum condition of the network.

Finding the low-temperature state of a system when a prescription for calculating its energy (E) is given, simulates an optimization problem which is not unlike those encountered in combinatorial optimization.

When applied to the TSP, the "cost function" can be looked at as playing the role of the energy state (E).

Using the "cost function" in place of the energy (E) and defining the configurations by a set of parameters, it is common to use a developed algorithm to generate a population of configurations of a given optimization problem at some effective temperature. This temperature is simply a control parameter in the same units as is the cost function.

Now, the "simulated annealing process" consists of:

(1) Melting the system being optimized at a high effective temperature;

(2) Lowering the temperature by slow stages until the system "freezes";

(3) Noticing that no further changes are occurring.

At each temperature, the simulation must proceed long enough for the system to reach a "steady state". The sequence of temperatures and the number of rearrangements of the parameters attempting to reach equilibrium at each given temperature, can be considered an "annealing schedule". This type of schedule can be applied to an electronic network which simulated neuronic networks.

The use of parallel networks having different levels of "connection strengths" between each of the networks is discussed in an article, "Boltzmann Machines: Constraint Satisfaction and Networks that Learn", published in May 1984 by authors Hinton, Sejnowski, and Ackley through the offices of the Department of Computer Science, Carnegie-Mellon University and designated as technical report CNU-CS-84-119, and which was later published in the magazine *Cognitive Science*, Volume 9, 1985, pages 146-169 under the title of "A Learning Algorithm for Boltzmann Machines". This involved the study of "connectionist" systems that store their long-term knowledge as the strengths of the connections between simple neuron-like processing elements. These networks are apparently suited to tasks like visual perception which can be performed efficiently in parallel networks and which have physical connections in just the places where processes need to communicate. Included in the Technical Report were the observations on a parallel constraint satisfaction network called a "Boltzmann Machine" which is apparently capable of learning the underlying constraints that characterize a "domain of information" simply by being shown examples of information from the particular domain. The network modifies the strength of its "connections" so as to construct an internal generative model that produces examples with the same probability distribution as the examples it is shown.

The Boltzmann Machine is composed of computing elements called "units" that are connected to each other by "bidirectional links". A unit is always in one of two states—"on" or "off"—and it adopts these states as a probabilistic function of the states of its neighboring units on the "weights" on its links to them. These "weights" can take on real values of either sign.

A "unit" being "on" or "off" is taken to mean that the system currently accepts or rejects some elemental hypothesis about the domain of information. The "weight" on a link represents a weak pairwise constraint between two hypotheses. A "positive weight" indicate that the two hypotheses tend to support one another, if one is currently accepted, then accepting the other should be more likely. Conversely, a "negative weight" suggests that, other things being equal, then the two hypotheses should not both be accepted.

One apparent aspect of the Boltzmann Machine arrangement is that it leads to a domain-independent learning algorithm that modifies the connection strengths between units in such a way that the whole network develops an internal model which captures the underlying structure of its environment.

The learning algorithm presupposes that the network reaches "thermal equilibrium" and that it uses the cocurrent statistics, measured at equilibrium, to create an energy landscape that models the structure of the ensemble of vectors produced by the environment. At the same time it should be noted that there is nothing in this learning algorithm to prevent it from creating an energy landscape that contains large energy barriers which then prevent the network from reaching equilibrium.

Neurons are recognized as complex biochemical entities and it is not considered that these simple binary units, such as the Boltzmann Machine system, are a full representation or simulation of the actual models of neuronic networks. However, the assumption is used that the "binary units" change state "asynchronously" and that they use a probabilistic decision rule.

The "energy gap unit" for such a "binary unit" seems to play a role similar to that played by membrane potential for a neuron. Both of these are the sum of the excitatory and inhibitory inputs and both are used to determine the output state.

The "energy gap" represents the summed output from all the recent active binary units. If the average time between updates is identified with the average duration of the neuron's "post-synaptic potential", then the binary pulse between updates can be considered to be an approximation to the post-synaptic potential. The sum of large number of stochastic pulses is independent of the shape of the individual pulses and depends only on their amplitudes and durations. Thus, large networks can act to provide the "fan-in" effect which may be typical of the average cerebral cortex.

"Random asymmetries" or "noise" in the system would appear to be reduced through the hierarchical structure providing the "fan-in".

It is also considered that there are certain effects in the biological nervous system called "time-delays", but that these be considered to act like added "noise". It is considered that the two main ideas that led to the Boltzmann Machine are that: "noise" can help with the searching computation process; and that Boltzmann distributions make it possible to assign credit on the basis of "local" information in a non-linear network.

SUMMARY OF THE INVENTION

A special-purpose neural computer for solving optimization problems is described and architecturally organized.

A network of neuronic processors having its own satellite nodal structure is organized into Nodal groups or "nodes" whereby each node has a connection to each of the other nodes on the basis of a "fixed connection delay" which can be implemented in very large scale integration circuitry to provide a specialized environment for the rapid solution of optimization problems.

The use of the "fixed connection delays" provides a natural way for "noise" to be used to avoid a condition of local minima entrapment.

Each nodal group or node consists of a nodal processor, a nodal weight and delay memory, a scheduler memory, a decision algorithm memory, and a memory latch.

Each of the nodes is interconnected to each one of the other nodes and all share, through a multiplexer, the use of a network history memory.

The overall operational structure is monitored and controlled by a processor-controller connected to an input/output controller unit. The processor-controller connects to each of the nodal (node) groups, to a common multiplexer, and to the common network history memory.

Operatively the network history memory provides a record of the status of each of nodal processors for each given machine cycle. The data of the "past history" status of each nodal processor is fed to each of the other nodal processors via the history memory. The history memory is scanned by the processor-controller unit in order to sense the "global energy state" of the entire system and to determine when this global energy state has been minimized.

The processor-controller unit can then sense when the outputs of the nodal processors have settled down into a relatively "unchanging state" from machine cycle to machine cycle and can thus determine when the system energy (E) has been minimized so as to indicate an optimum solution has been reached.

The output of the processor-controller unit can be transmitted via an I/O controller to a cathode ray tube display to indicate optimal output parameters or can be used to display numerical or symbolic data indicating an optimum answer of values of the independent variables involved.

GENERAL OVERVIEW

"Simulated annealing" is an efficient, maximum entropy algorithm for solving nonpolynomial time (NP) complete optimization tasks. By judiciously controlling "noise", it mimics the natural process of annealing, where the temperature (T) is associated with "noise" and the objective function of "stability" is associated with the physical energy state.

Disclosed herein is a network of binary neuronal processors provided with "fixed" connection delays. Because of the fixed connection delays between and every one of the neuronal processors, the network "cools" as it approaches the condition of stability. This seems to be a curiously inherent feature of such a "delayed" model system.

Figure 7:
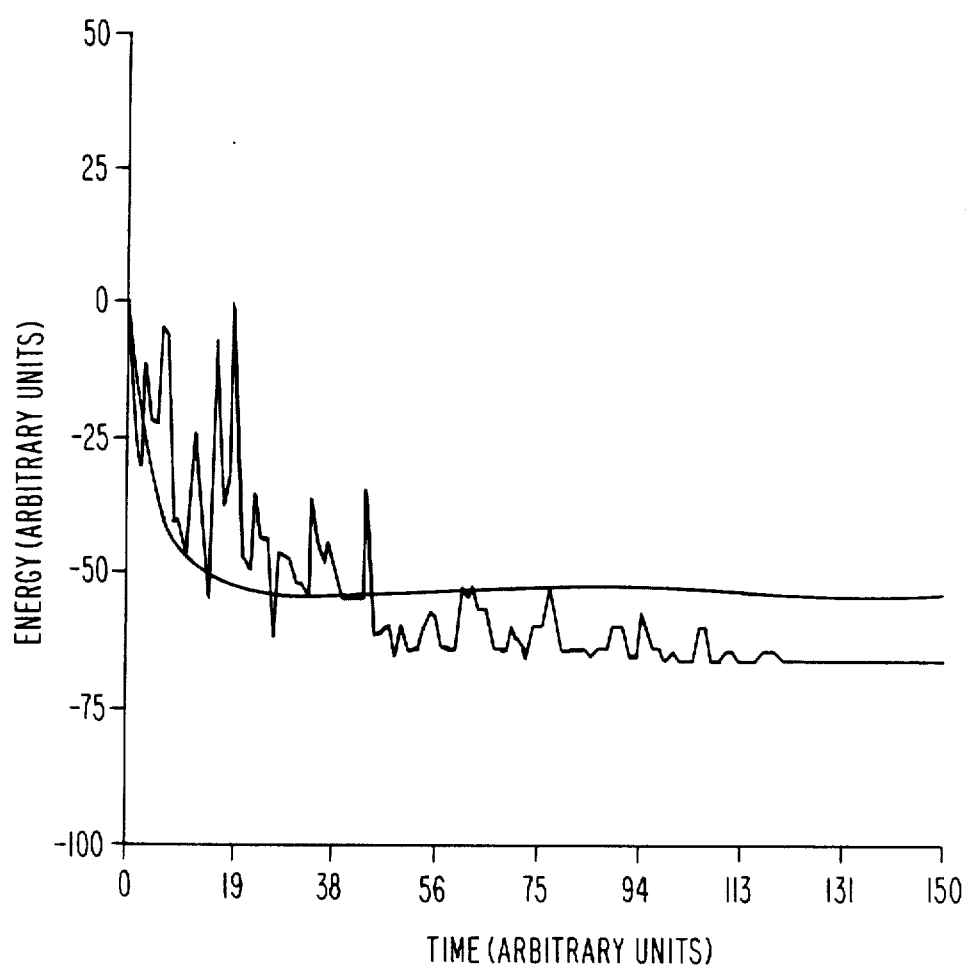
FIG. 7 is a drawing of the energy state of a Global Network used for experimentation showing the energy-minimization with time as greater optimizing solutions are executed.

As will be observed in FIG. 7, there can be seen the minimization of the network's "energy" (E) which occurs as a function of time. Through the use of the "weight" of the interconnections between each of the neuronal processors, the energy (E) can be mapped to fit the objective function of a variety of optimization tasks.

Previous investigators have shown that an analog realization of such a neuronic network can be used to solve a variety of optimization tasks. However, this disclosure indicates that an analog representation is not necessary and that simple binary processors, using connection-delays will provide rapid solutions to optimization tasks. The system described here would represent a simple and fast special purpose parallel processor system, and since this network uses only binary processors, it can be implemented in simply in traditional very large-scale integration circuitry (VLSI). However, other more complex implementations are also feasible.

Figure 2:
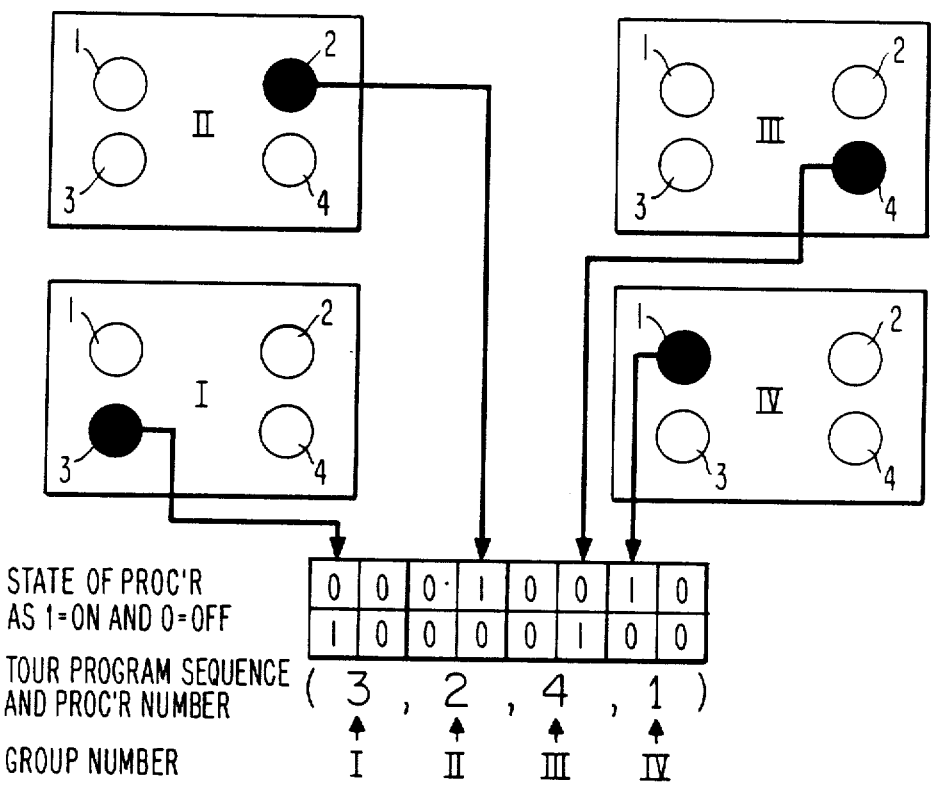
FIG. 2 is a schematic drawing of a 16-processor (neurons) global network which is illustrative of the solving of the TSP, Travelling Salesman Problem.

In regard to the previously mentioned TSP, or Travelling Salesman Problem, reference may be made to FIG. 2 which involves a system of 16 processors which might be used for solving a four-city TSP. As seen in FIG. 2, there are 16 processors organized in groupings of four processors each. These groupings of four processors are designated with I, II, III, IV. Within each group there are set of four processors each having an numerical designation. The TSP is considered as the archetype of typical hard optimization problems, and can be stated as: Find that sequence of routings which will minimize the distance travelled by a travelling salesman who must travel to N cities stopping at each city only once. Legitimate travel tours can be represented as a permutation of N integers where each city is labeled with a number. Thus in each of the four groupings of four processors, the processor No. 3 would represent city No. 3, while processor No. 2 would represent city No. 2, and processor No. 1 would represent city No. 1, etc.

At the bottom of FIG. 2, there is shown a sequence of "states" of at least one processor from each one of the four groups. Thus the sequential symbols 3, 2, 4, 1 might represent one possible tour having the meaning of starting at city 3, then proceeding from city 3 over to city 2, then proceeding from city 2 over to city 4, then proceeding from city 4 over to city 1.

Each of the 16 processors shown in FIG. 2 are binary types which means their output is either "on" or it is "off." Those processors which currently have an output as "on" are shown in the heavy black lines which are completely filled in while all those processors whose output is "off" have empty white space within the periphery of their circles.

Thus the hardware for solving the four-city problem might consist of four groups of four processors each. Each group (I or II or III or IV) of processors represents a place in the permutation. Thus within each group, each processors is identified with that number which represents a particular one of the four cities. Each processor can be in only one of two states—"on'-'—meaning that this city is the one that should take this place or position in the permutation, or "off", the reverse. The connections between each of these processors are chosen to encourage the entire network of processors to choose a final stable state—this state being the current value of each processor as to whether it is "on" or whether it is "off" which represents a legitimate and short tour.

The type of hardware system for efficiently solving the four-city TSP might, for example, consist of a system whereby four groups are provided and there are four neuronic processors within each group, such as in FIG. 2 where the four groups are labeled as I, II, III, and IV.

Within each group, each neuronic processor is identified with a number that represents one of the four cities, and the arrangement is such that each processor can be in only one of two possible states whereby the "on" condition means that that particular city is the one that should take that particular place in the sequences of travel routing permutations.

Not shown in FIG. 2 is the condition where every single one of the 16 processors has a cross-connection to every single one of the other processors which would, in effect, represent a combinatorial matrix system. These connections between the processors are chosen so as to "encourage" the entire network of processors to choose a final stable state, this final stable state being the continuously stable value of the current value of each processor, whether "on" or whether "off".

Since it is known that these system operations will act to minimize the global energy (E), this global energy (E) can be defined by a particular algorithm which is indicated as Equation A1, shown herein below.

$$E = -1/2 \sum_{1}^{N} \sum_{j}^{N} w_{ij} x_i x_j \qquad [\text{Eq. A1}]$$

Where
E = global system energy.
N = number of nodes or cities to visit.
Where w is the value, a positive or negative real number, of the connection-weight between the processor i and the processor j; and
$x_i$ is the current state (0 or 1) of the $i^{th}$ processor.

The values of W are chosen so that low energy states correspond to short, legitimate tours. Connections between processors within the group are such that high network energy results when more than one processor is "on" in order to discourage those operations involving "non-tours".

Similarly, connections between processors of two different groups "discourage" the same city from being in more than one place in the sequential permutation.

The system operates on a series of machine cycles. During each machine cycle, each processor consults its delay schedule unit 46. The delay schedule is stored as shown in unit 46. It consists of a sequence of random integers. Each integer monotonically increases so that there is provided a set of numbers which are "non-decreasing".

If each machine cycle is numbered so that the first cycle is "1" and the second machine is "2", then these numbers in the delay schedule unit 46 correspond to each of these machine cycles. The effect of the delay schedule unit is to make that particular processor wait the given number of machine cycles before it can evaluate the decision rule algorithm. A processor will only evaluate the decision rule (Equation A2) when the current machine cycle number matches a number stored in the delay schedule unit 46.—Each delay schedule unit is programmed with the same sequence of random integers.

This algorithm is indicated herein below as Equation A2, and is called the "decision rule":

$$x_i(t) = 1 \text{ if } \sum_{i=1}^{N} w_{ij} x_j (t - n_{ij} \delta t) > U_i \quad [\text{Eq. A2}]$$

$$x_i(t) = 0 \text{ if } \sum_{i=1}^{N} w_{ij} x_j (t - n_{ij} \delta t) \leq U_i$$

Where $U_i$ is the "threshold value" and the symbol "n" is a square matrix of $N \times N$ configuration. This "threshold value" is set by the operator who programs the machine. The elements of "n" are integer samples from a uniform distribution designated, for example as 0, 1, 2 .... M. These reflect a "fixed delay" of $n_{ij}$ time-steps between the processing units i and j.

The quantity $x_j (t - n_{ij}\delta t)$ is the state of the $j^{th}$ neuron (1 or 0) at some time in the past, and $x_i$ is the current state of the i th processor (Neuron in a state of one or zero).

The current existing state of the network would be defined by a vector $\bar{x}$ as follows:

$$\text{Vector } \bar{x} \text{ equals } (x_1, x_2, x_3, \ldots x_i \ldots x_N). \quad [\text{Eq. A3}]$$

Figure 3:
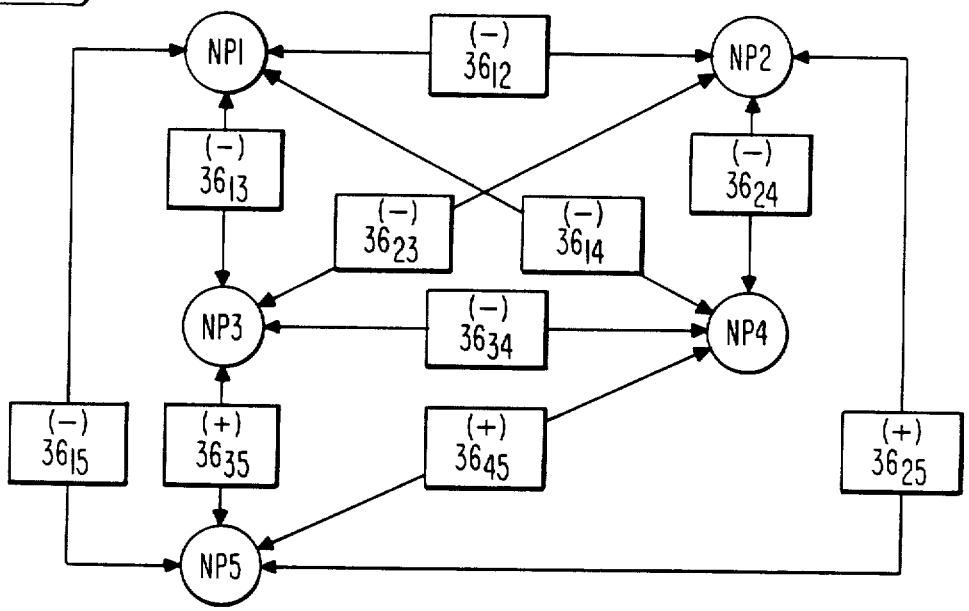
FIG. 3 is a schematic example of a number of groups of nodal processors shown to be interconnected each to another, with fixed connection weights (delay times) whereby connection weights are organized as positive (excitatory) or as negative (inhibitory).

FIG. 3 is schematic representation of a typical group of four processors showing how each processor is interconnected to and influences each one of the other processors in that group. The square box units which connect between each of the processors in the group of four are called nodal weight and delay units. The "plus" signs indicate positive values of the connection weight-delay value $w_{ij}$ and the "minus" symbols indicate negative values of $w_{ij}$. These "plus and minus" values are relative only in the sense that they indicate a greater or lesser digital value.

The negative values discourage any two processors from being "on" at the same time. The square box units 36 of FIG. 3 will constitute fixed delays which could be built from shift registers, for example, and the processors NP1, NP2, NP3, NP4 might be implemented as simple adder circuits.

Additionally, as illustrated in FIG. 3, a processor from another grouping (NP5) is interconnected to each and every one of the four processors of the previous group, NP1, NP2, NP3, NP4. This is to illustrate and give some indication that every one of the processors in the "first group" would be interconnected to each and every one of the four processors in the "second group", and likewise the same would hold true for the third and fourth groups of processors, as was indicated in regard to FIG. 2.

Referring to the Equation A2 above, it should be indicated that $x_i(t)$ would represent the state (0 or 1) condition of the $i^{th}$ processor during the "machine cycle" occurring at any given particular time "t".

Symbol N would represent the number of processors operating in the system, and the symbol $n_{ij}$ would represent the square of the number of processors, that is to say $N^2$.

DESCRIPTION OF PREFERRED EMBODIMENT

Figure 1:
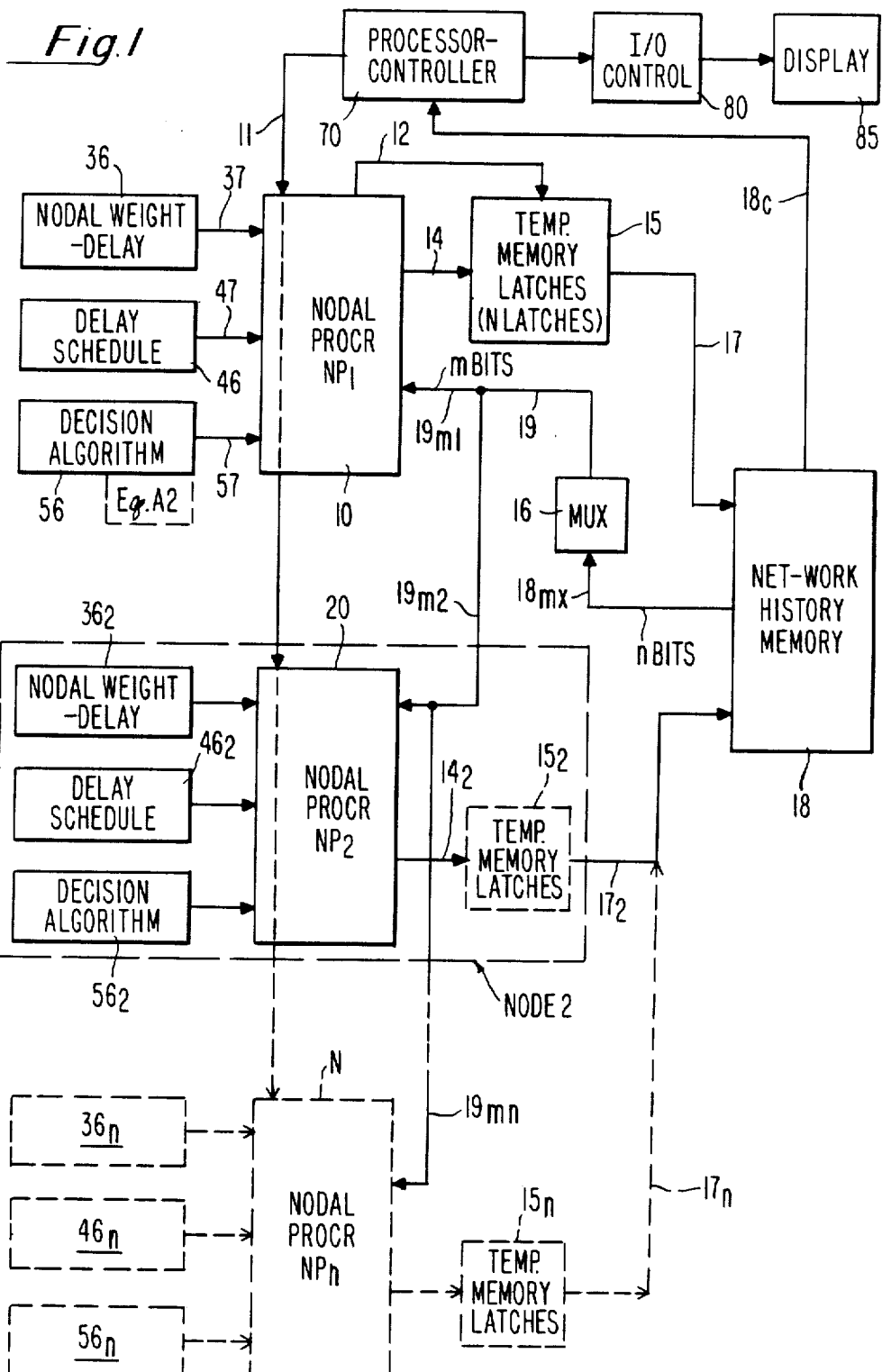
FIG. 1 is a global system view of a plurality (N) of nodal processors organized in nodal (nodes) groups all connected to a network history memory.

The special purpose neurocomputer system of the present disclosure is shown in a preferred embodiment thereof in FIG. 1.

The basic architecture involves a series of processors designated as nodal processors which are identical in nature and which have been designated as processors 10, 20, 30, ... i ... N. Since the number of processors is a variable, the designation "N" is used to signify the total number of nodal processors in the system and any selected intermediate in the system may be designated as processor "i". For certain purposes, the series of Nodal Processors are referred to as $NP_1, NP_2, \ldots NP_N$.

As will be seen in FIG. 1, the overall system may be observed in terms of "Nodes" whereby each "node" consists of a set of intercooperating units. For example, the first node may be conceived as involving the nodal processor 10 together with the units designated as the "nodal weight and delay memory" 36, the schedule memory 46, the decision algorithm 56, each of which provides inputs to the nodal processor 10. Additionally, the first "Node" would also include a temporary memory latch 15 which receives outputs from the nodal processor 10. Likewise, each subsequent Node has its own Memory Latch as $15_2, 15_3, \ldots 15_n$.

In FIG. 1, a typical "Node" is shown as NODE 2 with heavy broken lines to show the nodal unit.

Then similarly, each of the series of other nodes concatenated into the system include the same type of units ($36_n$, $46_n$, $56_n$) which characterize every other node.

During each operating cycle, a nodal processor such as 10 or 20, etc., consults its schedule unit 46 ($46_2$, etc.) and the schedule unit informs it as to how many machine cycles it should wait before it evaluates the decision rule and outputs its result.

The decision rule, previously cited as Equation A2, is given as follows:

$$x_i(t) = 1 \text{ if } \sum_{j=1}^{N} w_{ij} x_j (t - n_{ij} \delta t) > E_0 \quad [\text{Eq. A2}]$$

$$x_i(t) = 0 \text{ if } \sum_{j=1}^{N} w_{ij} x_j (t - n_{ij} \delta t) \leq E_0$$

Since it is observed that each neuron waits a number of small time steps, or "epochs" ($\delta t$ = one machine cycle), before evaluating its input and deciding to change its current output state, the Equation A2 is the "decision" to change its output state and is determined according to the parameter values in Equation A2.

The nodal processor, such as 10, 20, etc., will perform the computation of Equation A2 and output the result to the network memory 18. This transfer to the network memory is provided via bus 14, temporary memory latch 15, and bus 17. Since a processor's output is simply a 1 or a 0, all of these buses are one bit wide.

The computation of Equation A2 by the nodal processor requires input that represents the output of previous computations of other processors. This data is provided in a multiplexed fashion on bus 19m. All of the data stored in the network memory, unit 18, will be presented to each processor in a multiplexed fashion in one machine cycle. Input from bus 11, from the processor-controller 70 informs the processor 10, etc., which previous state is currently being presented on bus 11. This information consists of an 8-bit integer, with a "0" meaning the current state of the network is being presented, a "1" meaning the state one machine cycle in the past, etc. In conjunction with the delay information from the nodal weight and delay memory, 36, this data from the controller 70 allows the processor 10, 20, etc., to determine the past state of any other processor. For example, if $n_{12}=3$, from the weight and delay memory 36, then, when data from the controller 70 indicates that the state of the network as of 3 machine cycles ago is currently presenting itself on bus 19m1, processor 10 will record the value, 1 or a 0, presented on the second line of that bus. In other words, as the history of the system is presented on bus 19m1, $n_{ij}$ provides an index informing the $j^{th}$ processor which value to utilize from the $i^{th}$ line on bus 19m1.

The computation of Equation A2 also requires input that represents the "connection weight" between any processor i and any processor j. This information is also contained in the weight and delay memory 36 in the form of an array, FIG. 6. Each entry in this array, $w_{ij}$, represents the "amount" of "force" that one particular nodal processor is to exert upon another. Large positive values tend to encourage two processors to be in the same state; large negative values tend to encourage opposite states.

As discussed previously, the nodal weight and delay memory 36 contains the information for the connection weight array, w, and the fixed delay array, n. n is an N×N array configured similar to w (see FIG. 6) where each entry $n_{ij}$ represents the number of machine cycles that the output of unit i is to be delayed before its output is utilized by unit j. Each entry in w will be stored as a 16-bit signed integer, and each entry in n, an 8-bit unsigned integer. This array is n×p bits where n = number of nodes and
p = number of past-state histories stored in history memory 18.

Another array for "$n_{ij}$" is resident in the nodal weight-delay unit 36 and has a similar representation to the one shown absove for $w_{ij}$.

Here, in the $n_{ij}$ array, the number stored for each slot of $n_{ij}$ is an "unsigned" integer of 8 bits that represents the number of machine cycles that the output of processor i is to be delayed before its output is recesived and utilized by processor j.

The delay schedule memory 46, contains information telling the processor 10 how many machine cycles to wait before it evaluates the decision rule (Equation A2). This information consists of a series of integers. For example, a typical series might look like the following:
2,1,3,2,2,1,3,3,2,3,3,2,4,3,1,4,3,2,2,3,3,4,4,4,3,2,4,4,4, . .
.
The total length of series will be less than 2,000 entries. The numbers in the series are chosen randomly from a discrete uniform distribution whose upper bound is constantly increasing. By this we mean that initially these integers might be samples from [0,1,2], and finally, samples from [0,1,2,3,4,5,6,7,8,9,10].

Note that the delayed information contained in the array "n" is fundamentally different that the information stored in the delay schedule memory (shown as 46 in FIG. 1). The information in the delay schedule memory represents random delays, and is responsible for the asynchronous operation of the computer. As stated above, this delay tells the processor how many machine cycles to wait before it evaluates the decision rule (Equation A2). Whereas the information in entry "$n_{ij}$" in array n tells the processor that when it does evaluate the decision rule, it is to use the state of processor i "$n_{ij}$" machine cycles in the past. In short, the delay schedule tells "when" the decision rule is to be evaluated, and the array n, and w, contained in the nodal weight and weight-delay memory 36m tells the processor "how" to evaluate that rule.

The decision algorithm memory 56, shown in FIG. 1, contains the algorithm, in appropriate machine language, for nodal processor, unit 10 in FIG. 1, for the computation of the decision rule, Equation A2.

Figure 4:
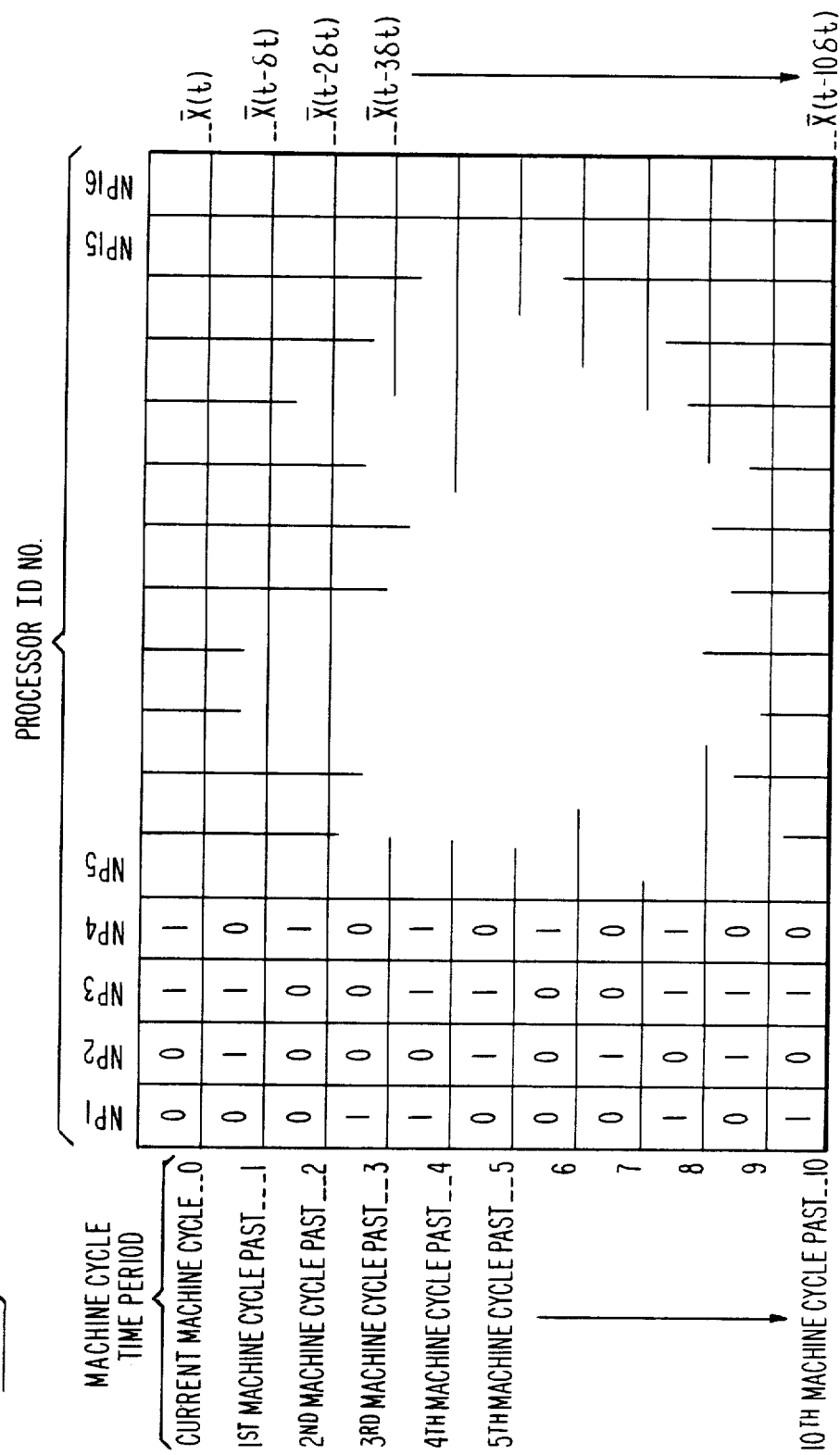
FIG. 4 is a schematic drawing of the network history memory which carries the state history (1 = "on" and 0 = "off") of the past status states of each of the nodal processors for each of the past machine cycles.

As seen in FIG. 1, the network memory 18 provides output data of n bits on the "state history bus" designated as $18_{mx}$. These output bits (n bits) are fed to the multiplexor 16 for distribution on output bus 19 to various of the processors via distribution buses such as $19_{m1}$ and $19_{m2}, \ldots, 19_{mi} \ldots 19_{mn}$. The content arrangement of History Memory 18 is shown in FIG. 4.

The processor-controller 70 informs the nodal processor 10 (and also processors 20, 30, . . . N) via bus 11 as to which one of the particular past states is currently being presented on the "state history bus" $18_{mx}$. FIG. 4 indicates how each nodal processor is recorded as being "on" or "off" during any given machine cycle.

As will be seen in FIG. 1, a processor-controller 70 monitors the nodal system network and also provides an output through the I/O controller 80 which may present a display to the terminal 85. The terminal 85 may be a cathode-ray tube output display or it may be merely a digital printout of selected information.

The processor-controller 70 may be any general purpose processor or may even be a unit such as the currently available types of personal computers.

The processor-controller 70 is used to continuously examine the current state of the network by scanning the network memory 18. The network memory 18 contains a history of the past states of each of the processors 10, 20, 30, . . . N, as seen in FIG. 4 and Table I.

The object of the comparison of these past states is in order to see whether or not the "state condition" of each of the nodal processors 10, 20, 30, . . . N has finally settled down to an unchanging set of data states which would indicate that the network has reached a point of "stability".

As long as changes keep occurring in the status states of each of the processors, it is understood that nonoptimum solutions are still being provided, and it is only when the optimum or close-to-optimum solution has been found that the status data in the network memory 18 will indicate that the status states of each of the processors have settled down into a semipermanent or permanent set of data which remains unchanging as various possibilities (different tour paths) are being explored.

Thus, a problem is deemed solved or "optimized" when stability of the data status states is achieved, or alternatively, some predetermined number of cycles has passed and the most probable optimum solution is at hand.

Stability of the "status states" is achieved when the comparison of successive states shows that the state bits are no longer changing from cycle to cycle and thus it is probable that a point of stability or optimization has occurred in the network.

The processor-controller 70 will continuously provide information to each of the nodal processors 10, 20, 30, . . . N about which particular state of the overall global system is currently being presented on the state bus $18_{mx}$.

The processor-controller 70 operates to initialize the computer by downloading data on bus 11 to each of the nodal processors 10, 20, 30, . . . N. This downloaded data on bus 21 would include connection weights and delays to the nodal weight and delay memory 36, the random delay schedule to the delay schedule memory 46, and the decision algorithm for the decision algorithm memory 56. In addition, the processor-controller will initialize the network history memory 18 via bus 18c. This initial data will set the memory with random values, 1 or 0.

Since most current processors have limitations on the number of input data lines allowable for input signals, the number of nodes in the network will most likely exceed the number of data input lines coming into each nodal processor 10, 20, 30, etc. Thus, the data, as it is presented to each nodal processor, must be multiplexed through the multiplexor 16.

In FIG. 1, the multiplexor 16 is seen receiving the output data of n bits from the history network memory 18 via the state history bus $18_{mx}$.

The network history memory 18 of FIG. 4 can be thought of as a two-dimensional N×P array where the entries in each row represent the state of each processor (the first entry corresponds to the state of first processor, the second entry the state of the second, and so on) at some time in the past. The first row, for example is the current state, $\bar{x}(t)=(x_1(t),x_2(t),\ldots,x_n(t)$. The second row represents the state of each processor one machine cycle in the past, $\bar{x}(t)=x_1(t-\delta t),x_2(t-\delta t),\ldots,x_n(t-\delta t)$, and the last row, the state P machines cycles in the past $\bar{x}(t)=x_1(t-P\delta t), x_2(t-P\delta t), \ldots, x_n(t-P\delta t)$.

The history data from the network memory 18 is presented to the processor-controller 70 via multiplexor 16 and to the processor-controller 70 on a row-by-row basis, in sequence during each machine cycle. All rows are presented in sequence in each machine cycle.

During each machine cycle, the "current state" of each one of the nodal processors 10, 20, 30, . . . N is read into the network memory 18 from each of the n latches which constitute the series of memory latches $15_1$, $15_2$, $15_3$ . . . $15_n$ shown in FIG. 1.

In FIG. 1, the temporary state memory latch 15 is shown receiving input on bus 14 from the nodal processor 10 and also receiving data on bus 12. An output bus 17 conveys the state information from the latch 15 over to the network memory 18.

Since each of the nodal processors 10, 20, 30, . . . N waits a certain number of machine cycles before evaluating (according to the decision rule of Equation A2) its input and deciding whether it should change state, (0 or 1) its "current" state must be preserved during these dormant periods. Thus, the the current state will sit in latch 15 and be presented to the network history memory 18 during each machine cycle.

Thus, each of the "nodes" in the system will have its own temporary memory latch such as 15, $15_1$, $15_2$, $15_3$, . . . $15_i$, . . . $15_n$, and each of the nodal processors 10, 20, . . . N, will be presenting its current state, for each machine cycle, to the network memory which can then store and carry a history of the state condition of each of the nodal processors for each of the previous machine cycles including the current machine cycle.

In the work of Hinton, Sejnowski and Ackley, on the Boltzmann machine, there was noted that delays in the system will "mimic" synaptic noise of the chemical synapse. These researchers and others have modeled the output function of a neuron as a "sigmoid-shaped", cumulative distribution—indicating the probability of maintained firing versus the input stimuli signals.

In the Boltzmann machine, neurons are modeled as stochastic units whose output is a Boltzmann distribution. In this distribution, "temperature" is a parameter which governs the amount of randomness, and consequently the shape. This temperature parameter is an "external" method of influence on the system. Contrarily, the presently described system uses "internally generated" delays to mimic noise and to avoid local minima.

The system network disclosed herein has similarities with both Hopfield's two-state model, and also to the Boltzmann machine. Hopfield had demonstrated that a symmetrically connected network of binary neurons would find a "local minima" of an extrinsic quantity, which he identified as the system's "energy". He showed that this model can function as an error-correcting content addressable memory. In his later work, the two-state model was dropped for a non-linear analog model. The "smoothness" of the analog model was shown to accentuate the identification of "good" solutions to optimization problems.

In the Boltzmann machine, low energy states are achieved by "simulated annealing", a method of utilizing "noise" to escape the local minima (partially optimum solutions). By starting with the "temperature" parameter relatively "high" and then slowly lowering it, the probability of locating a stable state with low energy was significantly enhanced. This process, called simulated annealing, was modeled since it emulates the attainment of low energy quantum states in metals by slow cooling.

The presently disclosed delay model system network resembles the Boltzmann machine in that delays do seem actually to mimic "noise", and noise allows the escape from local minima. However, unlike the Boltzmann machine, the present system provides randomness, and the variability of that randomness is provided as a function of time, and these factors appear to be an intrinsic property of the presently disclosed delay model system network.

The presently disclosed neuronic system network is similar to Hopfield's two-state model. The network consists of N "neurons" where each neuron has two states which are indicated as "0" (not firing) or "1", (firing at a maximum rate).

The output of the $i^{th}$ neuron is connected to the input of the $j^{th}$ neuron with a "weight" designated as a $w_{ij}$.

Figures 5, 6:
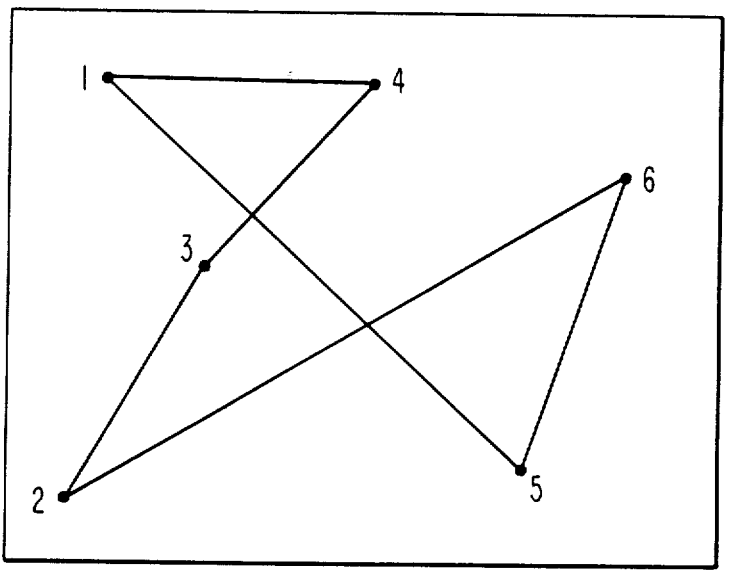
FIG. 5 is a typical output trace that might be shown for optimization of the TSP, Travelling Salesman Problem, for a tour of six cities.
FIG. 6 is a schematic representation of the nodal weight circuits which indicates the subject of the connection "weight" between each and every one of nodal processors in the network.

As will be seen in FIG. 6, the nodal weight-delay memory 36 of FIG. 1 is seen to provide a relationship table whereby the weight-delay time relationship between any two individual neuronic processors in the network is provided for and shown in FIG. 6. The matrix w is symmetric, that is to say, the output of neuron i in relationship to neuron j has the same weight as the neuron j has to the neuron i. Since no neuron may synapse on itself, there is seen a set of diagonal zeroes to indicate this in FIG. 6.

This system network of neurons (processors) is asynchronous in the sense that each neuron waits a random, integral number of machine cycles, called "epochs" ($\delta t$), before evaluating its input and deciding to change its current state. Each processor waits a certain number of machine cycles before evaluating the decision rule of Equation A2 to determine whether to remain in the same state or to change its state (0 or 1). Then, its current state, will reside in latch 15 and then be presented to the history memory during each machine cycle for storage therein. This number of machine cycles is chosen from a uniform distribution, [1, 2, 3, . . . R] where R is the maximum number of epochs a neuron waits before it "evaluates" its current status. The decision to change the output state is made according to the "decision rule" which is often called the McCulloch-Pitts decision rule which was discussed in the *Bulletin of Mathematical Biophysics*, Vol. 5 1943 in an article entitled "A Logical Calculus of the Ideas Imminent in Nervous Activity" by W. S. McCulloch and Walter Pitts. This decision rule is shown accordingly to be represented by the hereinbelow equation marked Equation B1:

$$x_i(t) = 1 \text{ if } \sum_{j=1}^{N} w_{ij} x_j (t - n_{ij} \delta t) > E_0, \text{ and} \quad [\text{Eq. B1}]$$

$$x_i(t) = 0 \text{ if } \sum_{j=1}^{N} w_{ij} x_j (t - n_{ij} \delta t) \leq E_0$$

where $E_0$ is the threshold and n is a square matrix of $N \times N$. The "threshold" symbol $E_0$ is essentially the same concept as that shown in the previous Equation A2 where the symbol $U_i$ is used for the threshold value. The elements of n are integer samples from a uniform distribution [0, 1, 2, . . . P]. They reflect a "fixed" delay time of $n_{ij}$ time steps between the neuron unit i and the neuron unit j. P represents the Maximum number of past states of the system that are to be retained, in history memory 18.

The quantity $x_j(t - n_{ij}\delta t)$ is the "state" of the $j^{th}$ neuron (1 = on or 0 = off) at some time in the past, in terms of the number of past machine cycles.

As previously stated in Equation A3, the current state of the network may be described by the vector $\bar{x}$ equal to $(x_1, x_2, x_3 \ldots, x_N)$.

This represents the overall condition of the network in terms of the status of each one of the processors as to wehther they are on $\{=1\}$ or off $\{=0\}$. Thus, some concept of the conditional stability or "unchangingness" of the network can be represented.

In the system network described herein, several sets of simulations were performed. For example, in the first set of simulations, the parameters were set up as follows:

$$N = 25, M = 25, R = 3, \text{ and } E_0 = 0$$

The elements of $w_{ij}$ (see FIG. 6) were set up with real valued samples from the uniform distribution [minus the square root of N, and then the square root of N], such that the symbol $w_{ij}$ is equal to $w_{ji}$, and $w_{ii}$ is equal to zero.

During these simulations, with random initial starting points, it was seen that "stable points" were almost always found. Stable points were identified only after the network returned the same global state vector for M epochs. The time elapsed before a stable state was found varied widely from a minimum of 50 epochs, and in one run the system surged for over 1,000 epochs before the run was terminated without convergence. The system appears to move through configuration space randomly until some small islands of stability are reached. These islands involved two to three neurons whose state was unchanged for at least M epochs. When this condition occurred, the system usually continued with more and more neurons becoming "frozen" and with a relatively rapid convergence to a stable state.

This behavior, though rather unexpected, may, however, be subject to some qualitative explanation. It is useful to think of the model neurons (processors) that obey the McCulloch-Pitts decision rule as making decisions based on the update information that reached them through their inputs.

However, when "delays" are present, the neurons are making decisions based on "past states" of the system. Since the state of the system is usually constantly changing, there is a "nonzero" probability that with old information, a neuron will err in its decision. The neuron will thus not increase its firing rate, when it normally would have if its input information had been properly current in time.

The longer a neuron goes without changing state, the higher the probability of its transmitting current (present) information to those neurons that are connected to it. As the state of more and more neurons becomes "fixed", the remaining neurons will be found to utilize a higher percentage of "undelayed" inputs. Consequently, the "noise-like" effects caused by the delays is dimiminished, thus a more rapid propensity toward a stable condition occurs.

For a second set of simulations that were tried, it was sought to measure the neurons' output distribution at various levels of activity. The motivation was to determine how often a neuron "made a mistake" as a result of receiving old information. It was expected that when activity was high, (a lot of neurons evaluating their input per each epoch) that the errors resulting would be high. And likewise, when the activity was low, (only a few neurons evaluating their input per epoch) that the errors would be low.

The first set of simulations had shown that the probability of a neuron's changing state actually "decreased" as the network converged. Consequently, the noise-like effects of delays had to be separated from the tendency of the network to progress toward a stable point. This necessitated the introduction of another global parameter "p" which was identified as the "probability" of a neuron's changing state. This should be distinguished from the symbol "P" which represents the number of past machine cycles of status data being held in the history memory 18.

In the second set of simulations, it was arranged that all parameters remain the same except R, which was allowed to vary, and N, which was set to 100. Neurons evaluated their inputs according to two decision rules: (i) the first utilized delay times; (ii) the second decision rule did not utilize delay times so that the symbol $n_{ij}$ was equal to zero for all sets of ij.

Recordings were taken when the results of the two rules disagreed. A histogram that measured the number of times a disagreement between the two rules occurred was plotted versus a weighted sum of the input, E. Unlike the first set of simulations, state vectors were not updated according to the results of the decision rules to inhibit convergence. Rather, the decision to change a neuron's state was determined by sampling a uniform distribution between zero and one. If the result was less than "p" (probability of a neuron's changing state), the neuron's state was flipped. Statistics were gathered but not until at least 25 epochs had elapsed, in order to insure that enough state history was maintained to observe the true effects of the delays.

It was found that the recorded histograms, such as that shown in FIG. 7, closely matched the cumulative output distribution which was used in other probabilistic models. Thus these histograms will follow a pattern which is indicated by the shown hereinbelow Equation B2.

$$P(E, E_0, T) = \frac{1}{\exp[(-1/T)(E - E_0)] + 1} \quad [\text{Eq. B2}]$$

where E is the weighted sum of the input. The parameter $E_0$ shifts the curve horizontally, while T governs the shape. For a small value of T, the curve resembles a step function; for large values of T, the curve resembles a stretched-out "S".

T can be considered the measure of the level of noise or "temperature" of the system. Neurons whose output function obey Equation B2 with T equal to zero are called "deterministic".

Figure 8:
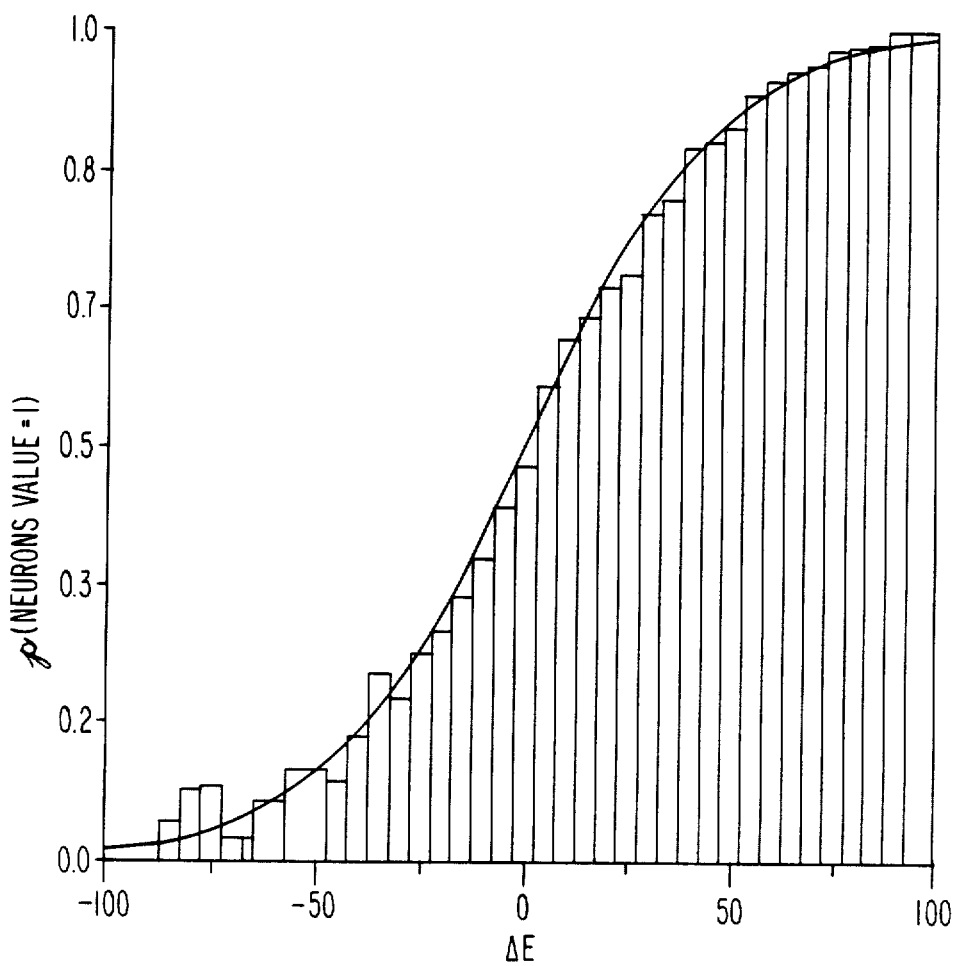
FIGS. 8 and 9 are histograms which show the probability of a neuron (processor) changing its output state as a result of the "weighted sum" of all the inputs (δE) to the neuron (processor) system network.
Figure 9:
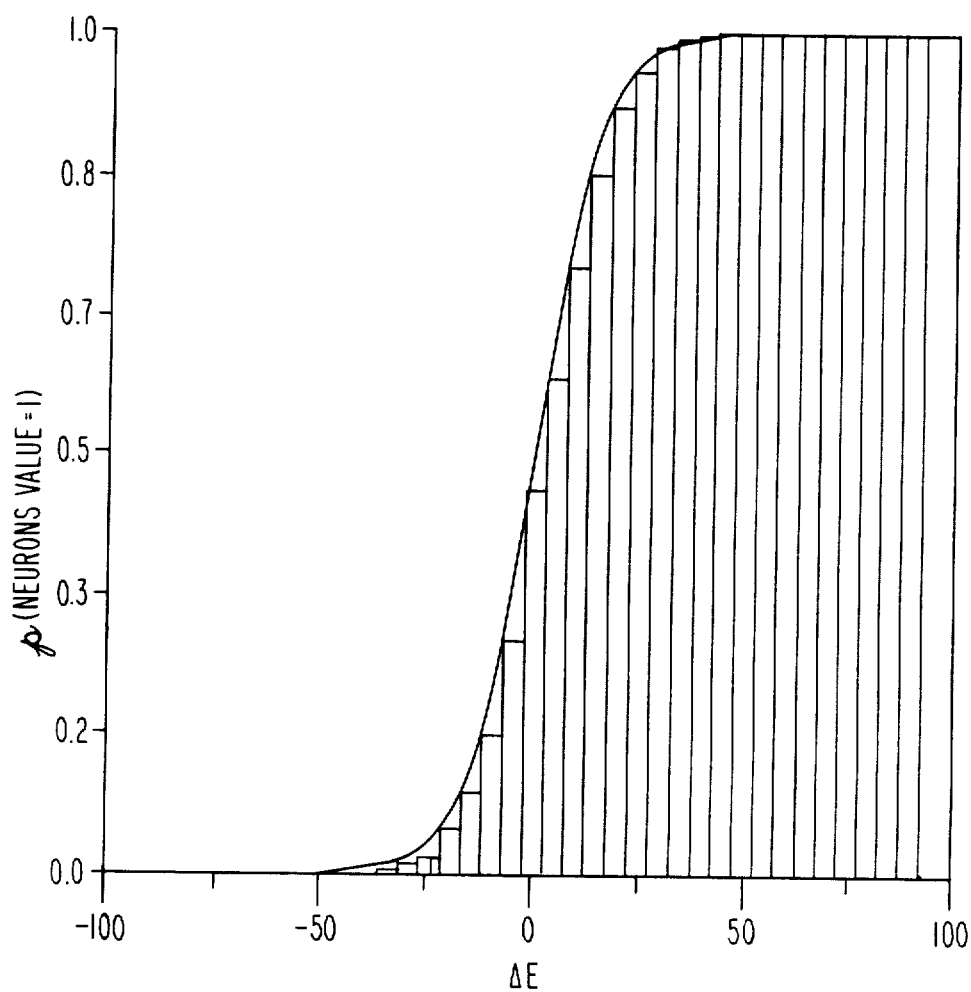

FIGS. 8 and 9 show the resulting histograms which fit with Equation B2. In FIG. 8, the statistics were recorded for 500 epochs. The p equals 0.1, and P equals 3, and T equals 23 as computed from the fit.

In FIG. 9, the parameters were p=0.01, R=3, and T=7.7. Similar large shifts in T were found with changes in R.

R represents the maximum number of epochs that a neuron waits before it evaluates its current status.

Additional histograms were also computed with non-random connection matrices. "w" was loaded with "weight-delay times" appropriate for a neural solution of the five-city Travelling Salesman Problem as developed by Hopfield and Tank in 1985 and 1986. In this case, the sigmoid shape was maintained but the curve was shifted horizontally. That this curve narrows with low activity, and as the network converges on a stable point, would suggest that with an appropriate choice of activity, the system might be made to "cool" slowly and consequently yeild "good" solutions to optimization problems. Such a system could be designated as exhibiting "auto-annealing".

As a result of the developments of a neuron-simulated system network, it was seen that the two-state model type neurons with connections delays have an intrinsic sigmoid-shaped output distribution similar to that used in other probabilistic models. In spite of this random or stochastic component, the simulations showed that, after identifying stable isolated neurons, the system usually proceeded to find a stable state. Samples of output distribution which were obtained showed that the distribution narrowed—indicating that the system was becoming deterministic, or "cooling"—as the network evolved toward a stable state.

The amount of noise in the network, or "temperature", was also dependent on the mean firing rate. It is thus considered that a combination of these two effects provided a natural way for a delayed system to minimize the system's "energy".

There has thus been described a preferred embodiment of a special purpose neurocomputer system for solving optimization problems. However, other embodiments and variations may still operate on the concepts disclosed herein and may be defined by the following claims.

What is claimed is:

1. A network of binary processors forming a network and operable to seek global minimum energy states, comprising:
    (1a) a plurality of N processor means wherein each said processor means includes a binary processor which is either "on"=1 or "off"=0 during each global machine cycle said 1 or 0 constituting status information;
    (1b) a plurality of cross-connection means for connecting each one of said N processor means to each other one of said N processor means;
    (1c) weight-delay means in each of said cross-connection means to carry said status information between any two processor means i and j as to whether i and j are "on"=1 or "off"=0 and to carry a weighted influence signal $w_{ij}$ which tends to inhibit (−) its counterpart processor means from being "on" (off=0) or encourages (+) its counterpart processor means to go "on" (=1), said + or − value of $w_{ij}$ being subject to a fixed delay time $n_{ij}$ before its influence $w_{ij}$ is effective on the said counterpart processor means;
    (1d) a network history means for storing the processor state of 1="on" and 0="off", of each processor for each past number "P" of machine cycles such that each processor may access present or past status information to implement a decision algorithm after which said weight-delay means becomes operative;
    (1e) processor-controller means for examining the status in said network history means, of each processor means over a past number of "P" machine cycles in order to evaluate the stability of a no-change condition for "P" machine cycles to indicate when the network of processors has reached a stable, non-changing state; and
    (1f) decision algorithm means for establishing whether each processor means will have an "off" status (=0) or "on" status (=1) for any given machine cycle, said decision means including:
        (1fa) an algorithm for evaluating inputs from other processor status and factoring in the fixed delay $n_{ij}$ plus the weighted influence signal wij around a predetermined threshold value; and
        (1fb) delay schedule means for delaying the execution of the algorithm evaluation for a predetermined number of machine cycles.

2. The network of claim 1 wherein said weight-delay means includes:
    (2a) a weight influence unit ($w_{ij}$) which is predeterminedly set to digital values of (−) "inhibit" and/or (+) "encourage" between a processor i and its counterpart j to provide inputs for said decision algorithm means which will establish which processors will be "on" and which will be "off" during each machine cycle;
    (2b) a delay unit ($n_{ij}$) which provides integer values, as between any processor i and its counterpart j, of time delay, in machine cycles, before the + or − influence of $w_{ij}$ can take effect.

3. The network of claim 1 which includes:
    (3a) multiplexor means for conveying said status information output data of present and past machine cycles from said network history means to each of said N processor means for each machine cycle.

4. The network of claim 3 wherein each said processor means includes:

(5a) a temporary memory latch for storing the present status (0 or 1) of said N processor means and transmitting said present status to said network history means for each machine cycle.

5. A multiprocessor system network comprising, in combination:

(6a) a plurality of N interconnected binary processor means wherein each processor means functions to solve the equation:

$$x_i(t) = 1 \text{ if } \sum_{i=1}^{N} w_{ij} x_j(t - n_{ij} \delta t) > U_i \quad [\text{Eq. A2}]$$

$$= 0 \text{ if } \sum_{i=1}^{N} w_{ij} x_j(t - n_{im} \delta t) \leq U_i$$

where $x_i(t)$ represents the state (0 or 1) of the $i^{th}$ processor;
where N = the number of interconnected processor means;
where $w_{ij}$ = the weight value as between processor means i and processor means j;
where $n_{ij}$ = an integer which reflects the number of fixed delay times, in machine cycles, between processor means i and j;
where $x_i(t - n_{ij}\delta t)$ represents the state of the $i^{th}$ processor means at some time in the past; and where,
$U_i$ = a selected threshold value, selected by a human operator; and $\delta t$ represents one machine cycle; and wherein each of said N processor means includes:

(6a1) a nodal weight-delay unit connected to said binary processor means and providing a $w_{ij}$ value (+ or −) of the influence (excitatory + or inhibitory −) between a first one of said binary processors and each and every other of said binary processors in said network, and an $n_{ij}$ value which represents a fixed time delay of $n_{ij}$ machine cycles between said binary processor i and j;

(6b) a network history memory means connected to each of said N processor means and storing the status (0 or 1) of each said processor means for each machine cycle of "P" past machine cycles, and functioning to provide past status data of other processors as input to processor means i, so as to implement $n_{ij}$ machine cycles of past status data;

(6c) processor-controller means connected to each of said N processor means and to said network history memory means and functioning to initialize and control said system network and wherein each said N processor means includes:

(6c1) a binary processor which produces a status output of two states which involve either being "on" or being "off";

(6d) and where said system network operates to minimize the equation A1 hereinbelow for the minimal value of E, where $$E = \tfrac{1}{2} \sum_{i}^{N} \sum_{j}^{N} w_{ij} x_i x_j \quad [\text{Eq. A1}]$$

where E represented the overall state of the system network and the function to be minimized; where $$\sum_{i}^{N} \sum_{j}^{N}$$

represents the sum of each of the current weight values between each and every processor means; and where $x_i$ and $x_j$ represent the current state (0 or 1) of each processor means i and j; and where $w_{ij}$ represents the weight influence of processor means i on processor means j; and (6e) a delay schedule memory unit connected to each of said processor means for storing a sequence of integers where each integer reflects the amount of time, in machine cycles, that said processor means is to wait, since the last evaluation of Equation A2, before again evaluating said Equation A2currently and transmitting an output signal to an interconnected other processor means.

6. The system network of claim 5 wherein said processor-controller means continuously scans the past-history states of each processor in the network and senses when the majority of processors have continuous non-changing states (0 or 1) for a number P of machine cycles which is always greater than the largest delay time of $n_{ij}$, in machine cycles.

7. The system network of claim 6 wherein said network includes:

(12a) an I/O controller to receive information data from said processor-controller means which indicates said continuous non-changing network condition and then conveys said data to a display means;

(12b) display means for receiving information data from said I/O controller for display to a human operator.

8. The system network of claim 6 which includes:

(13a) multiplexor means for transferring data from said network history memory means to each one of said N processors, said multiplexor means operating under control of said processor-controller means.

9. A multiple processor system network for developing solutions to optimization problems while simulating a neuron network, said system network comprising:

(14a) a plurality of system nodes wherein each system node includes:

(14a1) microprocessor means for executing a decision algorithm for finding optimum values of parametric independent variable of a scalar cost function:

(14a2) a decision algorithm memory means for storing said decision algorithm which enables said microprocessor means to set its status condition to "1" (=on) or "off" (=0), with data received from a nodal weight-delay memory means, from a delay schedule memory means, and from a network history memory, said decision algorithm representing the state of each microprocessor means as a function of the total sum of weight influence signals between each and every one of the said microprocessor means and of the fixed set of delay periods which are preset between each and every one of said microprocessor means;

(14a3) nodal weight-delay memory means for storing connection weight influence signals and machine cycle delay-time periods applicable to said decision algorithm;

(14a4) delay schedule memory means for storing random delay timeperiods for directing each said microprocessor means as to when said microprocessor means is to execute said decision algorithm to establish its status as "on" or "off";

(14a5) temporary memory latches for temporarily storing the history of past status states (0=off and 1=on) for previous machine cycles of said microprocessor means, said temporary latches connected to transmit said status states to said network history memory;

(14b) said network history memory connected to receive and store the past status states of each of said microprocessor means for each of "P" machine cycles;

(14c) processor-controller means connected to each one of said microprocessor means and to said network history memory to control and monitor each of said microprocessor means and to provide output parameters to a display means for indicating optimal solution parameters;

(14d) multiple interconnection means for cross-connecting each said microprocessor means to each and every other microprocessor means, each said interconnection means providing said weight influence signal of an inhibitory or excitatory nature, from a sending microprocessor means (i) to a receiving microprocessor means j, said weight influence signal having a fixed delay time $n_{ij}$ in terms of a number of machine cycles before transmission of a status state (0 or 1) signal from said sending microprocessor means to said receiving microprocessor means.

10. A multiprocessor network for deriving optimization result data for complex combinatorial problems, said network comprising:

(15a) a plurality of processor means, each sad processor means capable of parallel operation with each other processor means wherein each processor means has a status of "on"=1 or "off"=0 during each machine cycle;

(15b) cross-connection means for connecting each one of said plurality of processor means to each other one of said processor means;

(15c) fixed delay means affecting each one of said cross-connection means for delaying the time, in terms of machine cycles, required to communicate the output status of any one of said processor means to the input of another cross-connected processor means;

(15d) processor-controller means connected to a history memory or each said processor means to sense selected current and past processor means status information in order to evaluate the global network in seeking a minimal and stable energy condition of the network;

(15e) said network history memory, connected to each of said processor means and to said processor-controller, for storing the status (0 or 1) of each processor means for each one of the past machine cycles up to "P" past machine cycles.

11. The network of claim 10 wherein said processor-controller means includes:

(16a) means to sense when the majority of said processor means stabilize in a non-changing status state over "P" machine cycles where "P" is a number always larger than the largest number of machine cycles programmed as said fixed delay means;

(16b) means to transmit information to a display means for human observation.

12. A method for optimizing to the minimum value, the global energy state of a network of processors comprising the steps of:

(17a) interconnecting a plurality of N processors so that each processor has an output state of 1 (=on) or 0 (=off) which is cross-connected to each other processor to provide multiple inputs for each processor;

(17b) placing an inhibitory or excitatory value circuit which generates weighted influence signal ($w_{ij}$) into each cross-connection so that any sending processor i will transmit a weighted input to a receiving processor j;

(17c) effectuating a selected fixed delay time period ($n_{ij}$) into each cross-connection to delay the inhibitory (−) or excitatory (+) effect of $w_{ij}$ from a processor i to a processor j;

(17d) recording the "on" (1) or "off" (0) status of each of said N processors in a history memory over a period of "P" machine cycles;

(17e) executing a decision algorithm which determines the status (on/off) of each processor;

(17f) delaying the execution of said decision algorithm by a programmed and scheduled random delay means;

(17g) monitoring said history memory and each of said N processors to sense when the majority of processors have reached a stable non-changing state indicative of stable, minimal energy condition.

13. In a network of multiple processor nodes where each node includes a processor, a programmed nodal weight and delay unit, a delay schedule unit and decision algorithm unit functioning intercooperatively to establish the condition of stability in the status of the processors, the network comprising:

(18a) a decision algorithm unit for each processor to receive multiple inputs and to establish, during each machine cycle, a status condition of "on" (=1) or "off" (=0) for each processor;

(18b) a network history memory means for storing the status condition (on or off) of each processor for each machine cycle over a period of P machine cycles;

(18c) interconnection means for connecting the status condition of each processor selectively from the present or past machine cycle, as input to each other processor in the network;

(18d) said programmed nodal weight and delay unit functioning to provide a weighted influence signal and a time delay in the status condition being transmitted from a sending processor i to a receiving processor j;

(18e) said delay schedule unit functioning to provide a programmed delay period to said decision algorithm unit before said decision algorithm unit can execute its function of setting its associated processor "on" or "off";

(18f) means to initiate and control operation of said multiple processor nodes and to provide an output indication when said processors in said network have remained in a non-changing status condition for P machine cycles.

* * * * *